(12) United States Patent
Bierhoff

(10) Patent No.: US 6,611,490 B1
(45) Date of Patent: Aug. 26, 2003

(54) CLAMPING DEVICE FOR A DISC-SHAPED INFORMATION CARRIER

(75) Inventor: Waltherus C. J. Bierhoff, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/451,272

(22) Filed: Nov. 30, 1999

(30) Foreign Application Priority Data

Nov. 30, 1998 (EP) .......................................... 98204037

(51) Int. Cl.⁷ .......................................... G11B 17/028
(52) U.S. Cl. ...................................... 369/271
(58) Field of Search ................. 369/271, 270, 369/290, 291, 262

(56) References Cited

U.S. PATENT DOCUMENTS

| | | | | |
|---|---|---|---|---|
| 4,400,808 A | * | 8/1983 | Saito et al. ................... | 369/262 |
| 4,502,136 A | * | 2/1985 | Rickert et al. ............... | 369/271 |
| 5,469,421 A | * | 11/1995 | Aruga et al. ................ | 369/75.1 |
| 5,682,278 A | * | 10/1997 | Koseki et al. ............ | 360/99.08 |
| 6,038,206 A | * | 3/2000 | Mukawa ...................... | 369/271 |
| 6,041,033 A | * | 3/2000 | Otsubo et al. ............... | 369/271 |
| 6,163,520 A | * | 12/2000 | Kobayashi et al. ......... | 369/271 |
| 6,249,506 B1 | * | 6/2001 | Oowaki et al. .............. | 369/271 |

FOREIGN PATENT DOCUMENTS

WO      WO9301598     1/1993     ........... G11B/33/04

* cited by examiner

Primary Examiner—Brian E. Miller
Assistant Examiner—Dzung C. Nguyen

(57) ABSTRACT

A clamping device for a disc-shaped information carrier having a central clamping opening, includes a clamping member which is displaceable from a first position, in which the information carrier is clamped by the clamping member, to a second position in which the information carrier is released by the clamping member. The device further includes a lifting member which co-operates with the clamping member and which is displaceable from a first position, in which the lifting member is recessed with respect to a supporting member of the clamping device, to a second position in which the lifting member is raised relative to the supporting member. The device also includes a first locking member, which locks the clamping member in its second position when the lifting member is not substantially situated in its first position, and a second locking member, which locks the lifting member in its first position when the clamping member is not substantially in its second position. The device prevents the clamping member from exerting forces on the inner wall of the clamping opening of the information carrier when the information carrier is placed into or removed from the clamping device. Thus, preventing damage to the inner wall, and when the information carrier is a DVD, it prevents the two disc-shaped substrates of the DVD, which are adhered to each other, from being pressed apart by such forces. The clamping device can be used in a scanning device such as an optical disc player, for clamping an information carrier onto a turntable of the scanning device.

19 Claims, 8 Drawing Sheets

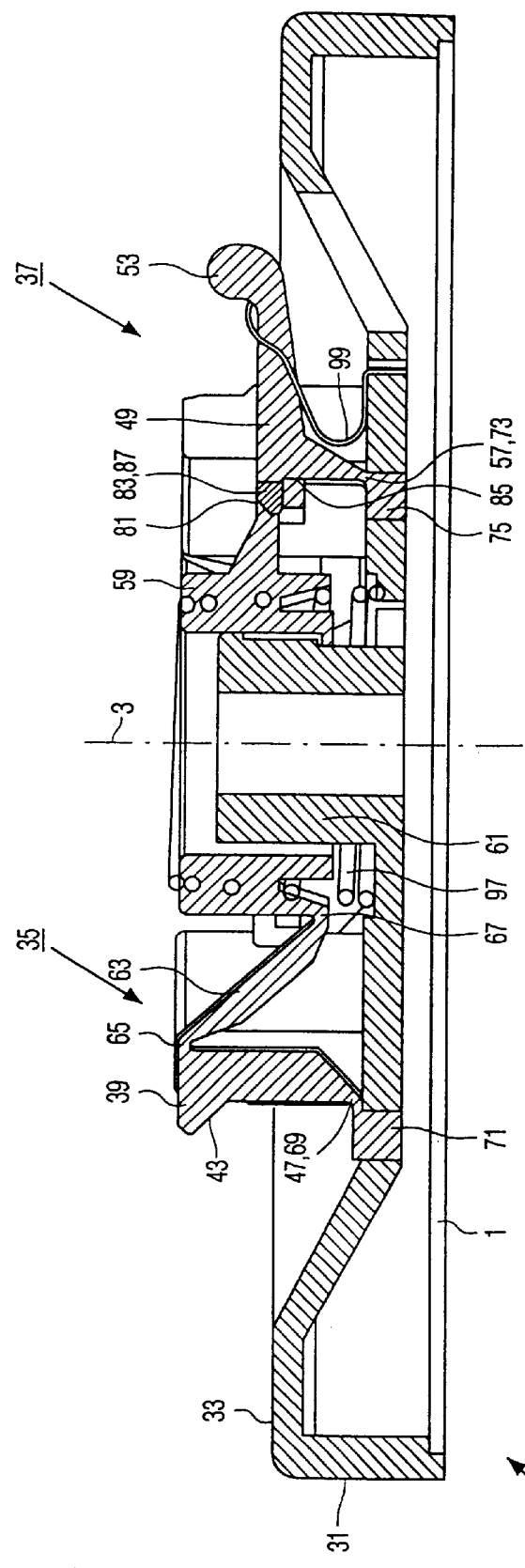

CLAMPING DEVICE FOR A DISC-SHAPED INFORMATION CARRIER

FIELD OF TECHNOLOGY

The invention relates to the field of disk positioning during recording and/or playing an optical disk.

BACKGROUND OF THE INVENTION

The invention relates to a clamping device for a disc-shaped information carrier having a central clamping opening, which clamping device is provided with a supporting member for the information carrier, a clamping member which can be displaced from a first position, in which the clamping member clamps the information carrier against the supporting member close to the clamping opening, to a second position in which the clamping member releases the information carrier, and a lifting member which co-operates with the clamping member and can be displaced from a first position, in which the lifting member is recessed relative to the supporting member, to a second position in which the lifting member is in a raised position relative to the supporting member.

The invention also relates to a scanning device for scanning information on a disc-shaped information carrier, which scanning device is provided with a table for the information carrier which can be rotated about an axis of rotation, a clamping device for clamping the information carrier on the table, and a scanning unit which can be displaced with respect to the table.

The invention also relates to the field of disk positioning during recording and/or playing an optical disk.

BACKGROUND AND SUMMARY

A clamping device of the type mentioned in the opening paragraphs is known from WO 93/01598. Said known clamping device can suitably be used in a box-shaped holder, for example, for a CD. The clamping member of the known clamping device comprises a number of clamping elements which can be displaced, while undergoing elastic deformation, from their first positions to their second positions. In order to clamp a CD in the holder, the central clamping opening of the CD must be pushed past the clamping elements, thereby causing the clamping elements to be displaced, by the central clamping opening, from their first positions to their second positions. After the central clamping opening has gone past the clamping elements, the clamping elements are displaced from their second positions to their first positions under the influence of the elastic deformation forces in the clamping elements, so that the CD is clamped by the clamping device. The lifting member of the known clamping device comprises a number of lifting arms which can be displaced, thereby also undergoing elastic deformation, from their first positions to their second positions. The known clamping device is further provided with a centrally arranged operating member by means of which the CD can be removed from the clamping device. To achieve this, the user must press the operating member, thereby causing the operating member to simultaneously move the clamping elements from their first positions to their second positions and the lifting arms from their first positions to their second positions. As a result, the CD is released by the clamping elements and lifted from the clamping device by the lifting arms. In this manner, a user-friendly operation of the clamping device is obtained.

The above citations are hereby incorporated in whole by reference.

A drawback of the known clamping device resides in that the clamping elements are pressed against the inner edge of the central clamping opening of the information carrier under the influence of said elastic deformation forces, when the central clamping opening is pressed past the clamping elements during providing the information carrier in the clamping device. As a result, the information carrier may be damaged near the central clamping opening. Said drawback of the known clamping device is particularly unfavorable if the known clamping device is used to clamp a DVD comprising two discs which are attached to one another. Under the influence of said pressure forces on the central clamping opening, the two discs may become detached, causing the DVD to become useless.

It is an object of the invention to provide a clamping device of the type mentioned in the opening paragraphs, in which the above-mentioned drawback of the known clamping device is precluded.

To achieve this, the clamping device in accordance with the invention is characterized in that the clamping device is provided with a first locking member, which locks the clamping member in its second position if the lifting member is not substantially in its first position, and a second locking member which locks the lifting member in its first position if the clamping member is not substantially in its second position. During placing an information carrier in the clamping device in accordance with the invention, the lifting member is displaced to its first position by the information carrier. Since the first locking member locks the clamping member in its second position if the lifting member is not substantially in its first position, the clamping member can only be displaced from its second position to its first position if the lifting member is substantially in its first position and the information carrier rests on the supporting member. In this manner, it is precluded that, during placing the information carrier in the clamping device, the clamping member contacts the information carrier before said information carrier rests on the supporting member. Since the second locking member locks the lifting member in its first position if the clamping member is not substantially in its second position, the lifting member can only be moved from its first position to its second position if the clamping member is substantially in its second position. In this manner, it is precluded that, during lifting and removing the information carrier from the clamping device, the clamping member contacts the information carrier. Since it is precluded, in this manner, that both during placing the information carrier in the clamping device and during removing the information carrier from the clamping device, the clamping member contacts the information carrier, it is precluded that, during placing the information carrier in and/or removing it from the clamping device, said information carrier is damaged near the central clamping opening by the clamping member.

A particular embodiment of a clamping device in accordance with the invention is characterized in that the clamping device is provided with means for exerting a pre-stressing force on the lifting member, said pre-stressing force being directed from the first position of the lifting member to the second position of the lifting member. If the lifting member is released by the second locking member, then the lifting member is displaced from its first position to its second position under the influence of said pre-stressing force, so that the information carrier is automatically lifted from the clamping device. By virtue thereof, the ease of use of the clamping device is improved.

A further embodiment of a clamping device in accordance with the invention is characterized in that the lifting member includes a number of lifting arms each extending substantially in a radial direction with respect to the information carrier, which lifting arms are provided, near a first end portion, with a supporting element for the information carrier, and which lifting arms are tiltable, near a second end portion, about a tilting axle extending substantially in a tangential direction with respect to the information carrier. By virtue thereof, a simple and practical construction of the lifting member is obtained.

Yet another embodiment of a clamping device in accordance with the invention is characterized in that the tilting axle of each of the lifting arms is formed by an elastically deformable hinge, the hinges jointly supplying the pre-stressing force exerted on the lifting member. As a result, said pre-stressing force is obtained in a simple and practical manner, and the number of parts of the clamping device is reduced.

A particular embodiment of a clamping device in accordance with the invention is characterized in that the clamping member includes a number of clamping elements each extending in a direction transverse to the information carrier, which clamping elements are provided with a clamping surface near a first end portion, and are tiltable, near a second end portion, about a tilting axle extending substantially in a tangential direction with respect to the information carrier. In this manner, a simple and practical construction of the clamping member is obtained.

A further embodiment of a clamping device in accordance with the invention is characterized in that the clamping member comprises a number of clamping elements which each extend in a direction substantially parallel to the information carrier, which are provided, near an end portion, with a clamping surface and can be swiveled about a swivel axle extending substantially perpendicularly to the information carrier. This too results in a simple and practical construction of the clamping member.

Yet another embodiment of a clamping device in accordance with the invention is characterized in that the clamping elements are coupled to a common operating member which can be displaced in a direction perpendicular to the information carrier, said clamping elements being jointly displaceable from their first positions to their second positions by a displacement of the operating member. Since the clamping elements can be jointly displaced from their first positions to their second positions by displacing the operating member, the ease of use of the clamping device is further improved.

A particular embodiment of a clamping device in accordance with the invention is characterized in that the clamping device is provided with further means for exerting a pre-stressing force on the operating member in a displacement direction of the operating member which corresponds to a displacement of the clamping elements from their second positions to their first positions. By virtue thereof, the ease of use of the clamping device in accordance with the invention is considerably increased. To clamp the information carrier into the clamping device, the user only has to place the information carrier on the supporting member. As a result, the lifting member is displaced into its first position, so that the clamping member is released from its second position by the first locking member, the clamping elements are displaced, under the influence of said pre-stressing force, from their second positions to their first positions, and the information carrier is clamped against the supporting member.

A further embodiment of a clamping device in accordance with the invention is characterized in that the clamping device is provided with an electromagnetic actuator for displacing the operating member. This further embodiment of the clamping device in accordance with the invention can very suitably be used in a scanning device for scanning information present on the information carrier. The electromagnetic actuator is controllable, for example, by means of an electrical control unit of the scanning device.

Yet another embodiment of a clamping device in accordance with the invention, in which the clamping device includes a number of clamping elements which can each be tilted about a tilting axle extending substantially in a tangential direction with respect to the information carrier, is characterized in that the first locking member is provided with a stop surface which is provided on the operating member and extends substantially parallel to the information carrier, while each of the lifting arms is provided, near its second end portion, with a locking element pertaining to the first locking member, which locking element serves to co-operate with the stop surface. This results in a simple and practical construction of the first locking member.

A particular embodiment of a clamping device in accordance with the invention, in which the clamping member includes a number of clamping elements which can each be tilted about a tilting axle extending substantially in a tangential direction with respect to the information carrier, is characterized in that the second locking member is provided with a further stop surface, which is provided on the operating member and extends substantially perpendicularly to the information carrier, while each one of the lifting arms is provided, near its second end portion, with a further locking element pertaining to the second locking member, which locking element serves to co-operate with the further stop surface. In this manner, a simple and practical construction of the second locking member is obtained.

A further embodiment of a clamping device in accordance with the invention, in which the clamping member includes a number of clamping elements which can each be swiveled about a swivel axle extending substantially perpendicularly to the information carrier, is characterized in that, near a further end portion, the clamping elements bear against a stop surface of the operating member while being subjected to a pre-stress, which stop surface comprises a conical portion extending transversely to the information carrier and serving to co-operate with the further end portions of the clamping elements. This results in the clamping elements being coupled in a simple and practical manner to the common operating member.

Yet another embodiment of a clamping device in accordance with the invention, in which the clamping member includes a number of clamping elements which can each be swiveled about a swivel axle extending substantially perpendicularly to the information carrier, is characterized in that the first locking member comprises a cylindrical portion of the stop surface of the operating member, which cylindrical portion extends perpendicularly to the information carrier and serves to co-operate with the further end portions of the clamping elements, said cylindrical portion connecting to the conical portion of the stop surface near an end portion of the conical portion where the diameter of the conical portion is largest, while each one of the lifting arms is provided, near its second end portion, with a locking element pertaining to the first locking member, which locking element serves to co-operate with a recessed portion provided in the operating member. In this manner, a practical and simple construction of the first locking member is obtained.

A particular embodiment of a clamping device in accordance with the invention, in which the clamping member includes a number of clamping elements which can each be swiveled about a swivel axle extending substantially perpendicularly to the information carrier, is characterized in that the second locking member comprises a further cylindrical portion of the stop surface of the operating member, which further cylindrical portion extends perpendicularly to the information carrier and connects to the conical portion of the stop surface near a further end portion of the conical portion where the diameter of the conical portion is smallest, while each one of the lifting arms is provided, near its second end portion, with a further locking element pertaining to the second locking member, which locking element serves to co-operate with the further cylindrical portion and a further recessed portion provided in the further cylindrical portion. This results in a practical and simple construction of the second locking member.

A scanning device of the type mentioned in the opening paragraphs is characterized in that the clamping device used therein is a clamping device in accordance with the invention. The above-described advantages of the clamping device in accordance with the invention manifest themselves in a particular manner in the scanning device in accordance with the invention.

BRIEF DESCRIPTION OF THE DRAWING FIGURES

These and other aspects of the invention will be apparent from and elucidated with reference to the embodiment(s) described hereinafter.

BRIEF DESCRIPTION OF THE DRAWINGS

In the drawings:

FIG. 4 is a sectional view of a second embodiment of a clamping device in accordance with the invention, which can be used in the scanning device shown in FIG. 1, FIG. 6b is a diagrammatic sectional view taken on the line VIb—VIb in FIG. 6a, and FIG. 6c is a diagrammatic sectional view taken on the line VIc—VIc in FIG. 6a.

DETAILED DESCRIPTION

Figure 1:
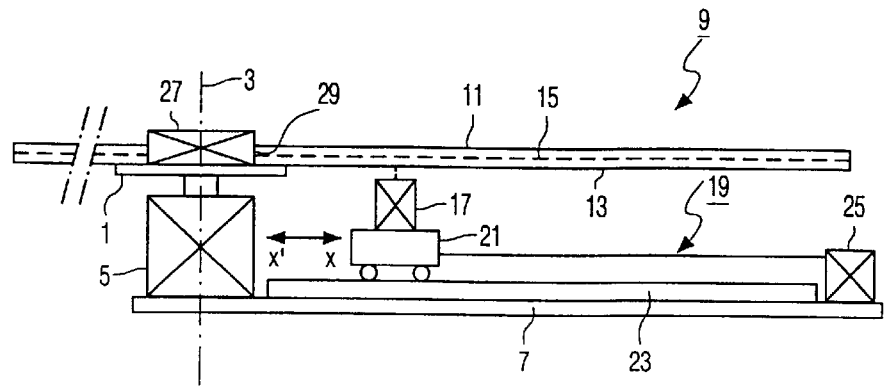
FIG. 1 diagrammatically shows a scanning device in accordance with the invention.

The scanning device in accordance with the invention, as diagrammatically shown in FIG. 1, is an optical player which can suitably be used to scan information on a disc-shaped optical information carrier 9, such as a CD or DVD. The term "scanning" includes reading of information from the information carrier 9 and/or writing of information on the information carrier 9. The scanning device comprises a table I which is rotatable about an axis of rotation 3 and drivable by an electric motor 5 which is mounted on a frame 7. On the table 1, an optically scannable information carrier 9 can be arranged which is provided, for example, with a disc-shaped carrier 11 and a transparent protective layer 13. A side of the carrier 11 bordering on the protective layer 13 forms an information layer 15 of the information carrier 9 on which a spiral-shaped information track is present. The scanning device further includes an optical scanning unit 17 for optically scanning the information track of the information carrier 9. The scanning unit 17 can be displaced with respect to the axis of rotation 3 predominantly in two opposite radial directions X and X' by means of a displacement device 19 of the scanning device. For this purpose, the scanning device 17 is secured to a slide 21 of the displacement device 19 which is further provided with a straight guiding means 23 over which the slide 21 is displaceably guided, which guiding means extends parallel to the X-direction and is provided on the frame 7, and with an electric motor 25 by means of which the slide 21 can be displaced over the guiding means 23. In operation, an electrical control unit of the scanning device, not shown in the Figures, controls the motors 5 and 25, thereby causing the information carrier 9 to be rotated about the axis of rotation 3 and, simultaneously, the scanning unit 17 to be displaced parallel to the X-direction, in such a manner that the spiralshaped information track present on the information carrier 9 is scanned by the scanning unit 17.

Figure 2:
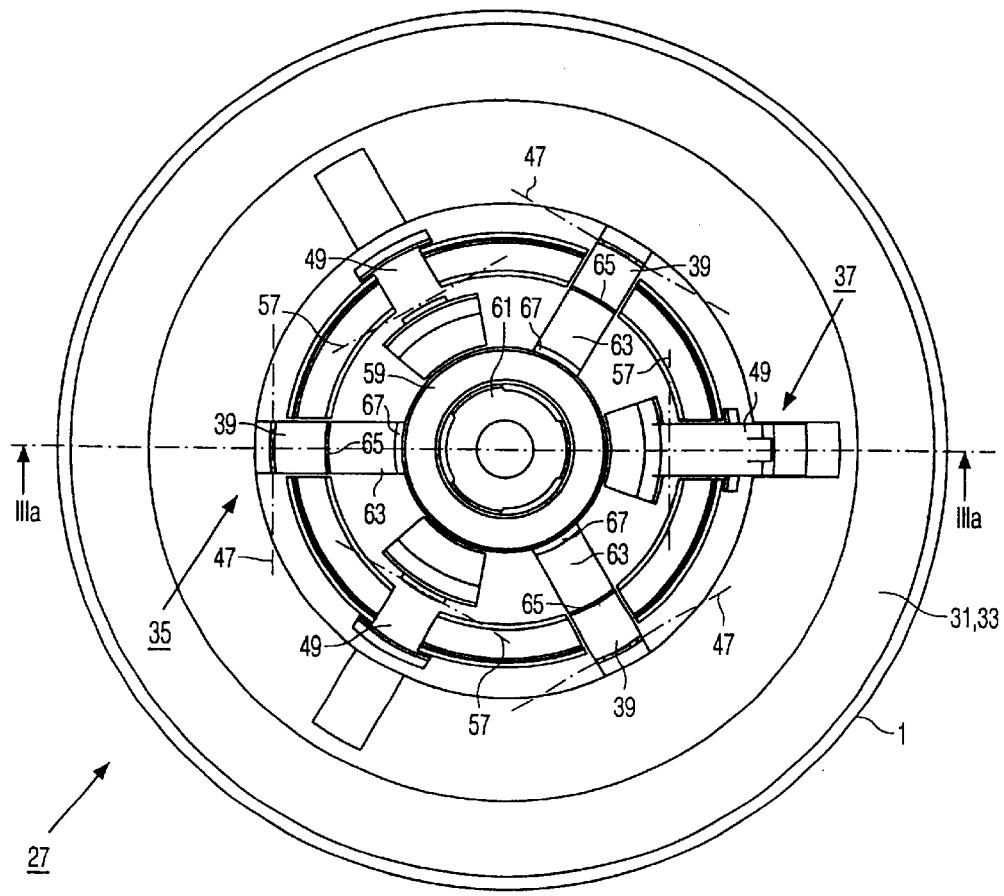
FIG. 2 shows a plan view of a first embodiment of a clamping device in accordance with the invention, which can be used in the scanning device shown in FIG. 1.

As shown in FIG. 1, the scanning device in accordance with the invention further comprises a clamping device 27 in accordance with the invention for clamping the information carrier 9 on the table 1. Said clamping device 27 is shown in detail in FIGS. 2, 3a and 3b, and co-operates with a central clamping opening 29 provided in the information carrier 9. It is noted that the information carrier 9 is not shown in FIG. 2. The clamping device 27 is provided with a ring-shaped supporting member 31 for the information carrier 9, which is concentrically arranged with respect to the axis of rotation and provided with a supporting surface 33 which extends at right angles to the axis of rotation 3. The clamping device 27 is further provided with a clamping member 35 and a lifting member 37 which co-operates with said clamping member 35. As shown in FIG. 2, the clamping member 35 includes three identical clamping elements 39 which are triangularly arranged around the axis of rotation 3. The FIGS. 3a and 3b, in which only one of the clamping elements 39 is shown in section, show that the clamping elements 39 each extend in a direction transverse to the supporting surface 33, that they are provided, near a first end 41, with a clamping surface 43 for cooperation with the central clamping opening 29 of the information carrier 9, and that, near a second end 45, they are tiltable about a tilting axle 47 which extends substantially in a tangential direction with respect to the axis of rotation 3. As is further shown in FIG. 2, the lifting member 37 includes three identical lifting arms 49 which are also triangularly arranged around the axis of rotation 3 between the clamping elements 39. The FIGS. 3a and 3b, in which only one of the lifting arms 49 is shown in section, show that the lifting arms 49 each extend substantially in a radial direction with respect to the axis of rotation 3, that they are provided, near a first end 51, with a supporting element 53 for the information carrier 9, and that they are tiltable, near a second end 55, about a tilting axle 57 which extends also substantially in a tangential direction with respect to the axis of rotation 3.

Figure 3A:
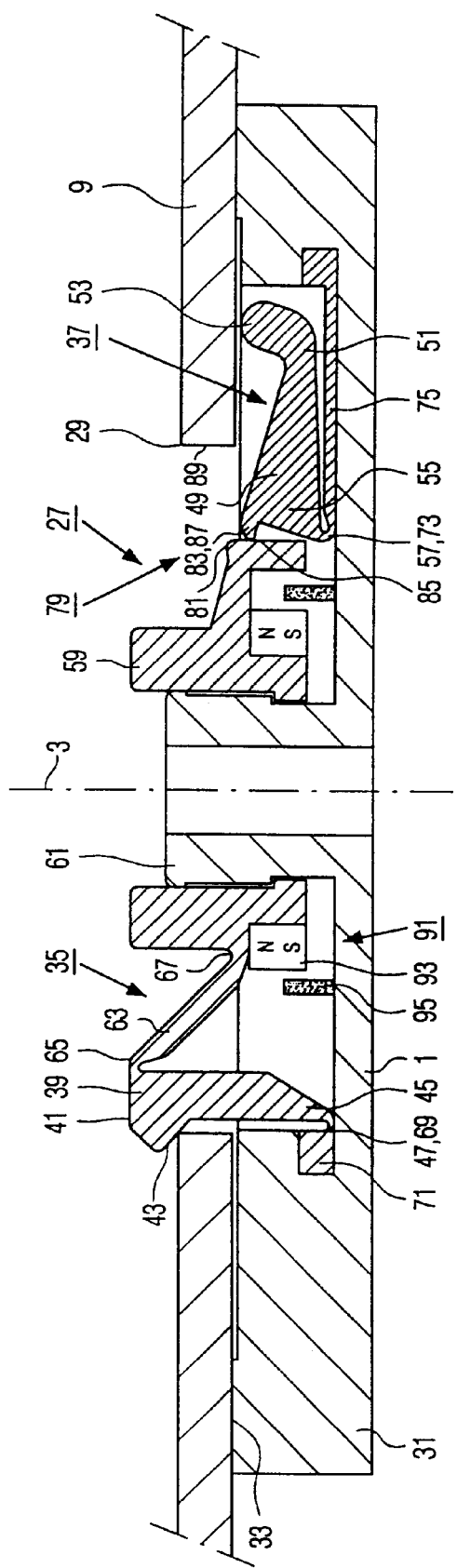
FIG. 3a is a diagrammatic, sectional view taken on the line IIIa—IIIa in FIG. 2, in which a lifting member and a clamping member of the clamping device are both in a first position.
Figure 3B:
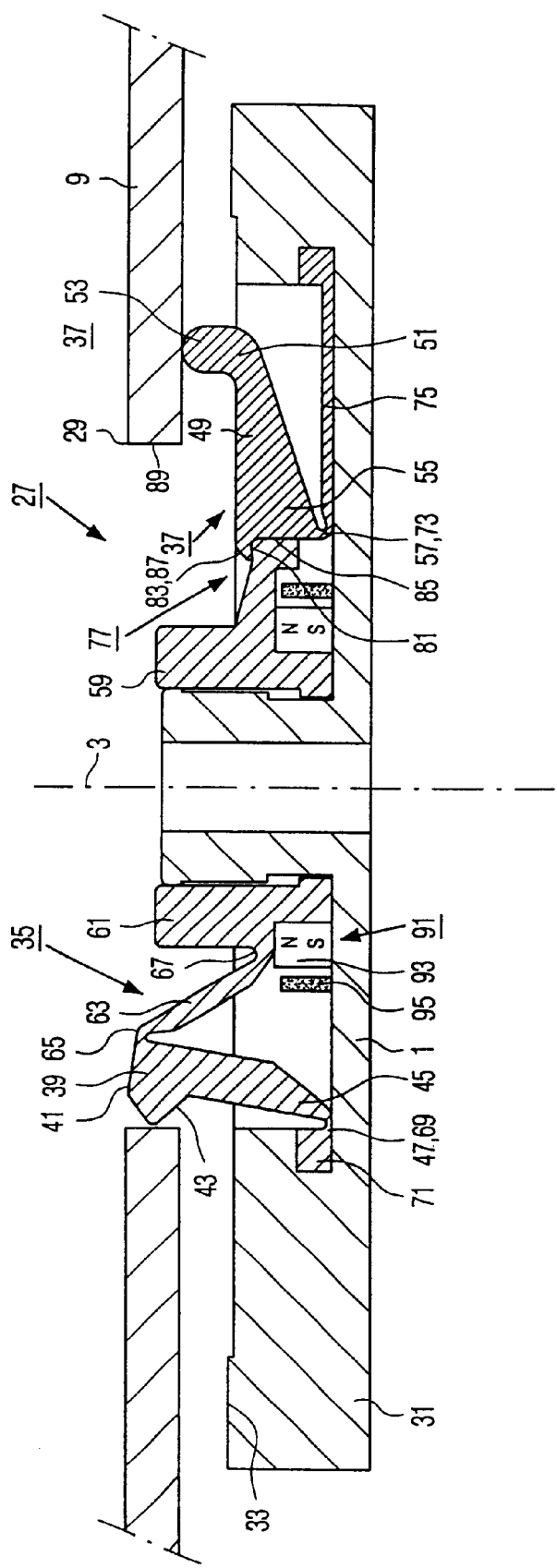
FIG. 3b is a diagrammatic, sectional view in accordance with FIG. 3a, in which the lifting member and the clamping member are both in a second position.

As the FIGS. 2, 3a and 3b further show, the clamping device 27 includes a bush-shaped operating member 59 which is centrally arranged between the clamping elements 39 and the lifting arms 49, and which is concentrically arranged with respect to the axis of rotation 3 and displaceably guided, parallel to the axis of rotation 3, with respect to a bush-shaped guide 61 which is secured to the table 1. The clamping elements 39 are each coupled to the operating member 59 via a separate bridge 63 which is connected to the relevant clamping element 39 via a first elastic hinge 65 and to the operating member 59 via a second elastic hinge 67. The clamping elements 39, the bridges 63 and the operating member 59 are, for example, jointly integrated so as to form a product of injection-molded synthetic resin. By displacing the operating member 59, the clamping elements 39 can be jointly displaced from a first position shown in FIG. 3a, in which the information carrier 9 can be clamped against the supporting member 31 by means of the clamping elements 39, to a second position shown in FIG. 3b, in which the information carrier 9 is released by the clamping elements 39. The operating member 59 thus forms a common operating member for the three clamping elements 39 of the clamping member 35. The tilting axle 47 of each of the clamping elements 39 is formed by an elastic hinge 69, each of the clamping elements 39 being connected via the hinge 69 to a securing element 71 by means of which the clamping element 39 is secured to the table 1. The elastic hinges 69 exert an elastic pre-stressing force on the clamping elements 39 and the operating member 59 in a displacement direction of the operating member 59 which corresponds to a displacement of the clamping elements 39 from their second positions to their first positions.

As shown in the FIGS. 3a and 3b, the tilting axle 57 of each of the lifting arms 49 is also formed by an elastic hinge 73, each one of the lifting arms 49 being connected via the hinge 73 to a securing element 75 by means of which the relevant lifting arm 49 is secured to the table 1. The lifting arms 49 can be displaced, by a rotation about the hinges 73, from a first position shown in FIG. 3a, in which the supporting elements 53 of the lifting arms 49 are recessed with respect to the supporting surface 33 of the supporting member 31, to a second position shown in FIG. 3b, in which the supporting elements 53 are raised with respect to the supporting surface 33. The elastic hinges 73 exert an elastic pre-stressing force on the lifting arms 49 of the lifting member 37, which elastic pre-stressing force extends in a direction which corresponds to a displacement of the lifting arms 49 from their first positions to their second positions.

In accordance with the invention, the clamping device 27 is provided with a first locking member 77, which locks the clamping member 35 in its second position if the lifting member 37 is not substantially situated in its first position, and a second locking member 79 which locks the lifting member 37 in its first position if the clamping member 35 is not substantially situated in its second position. As shown in FIGS. 3a and 3b, the first locking member 77 is provided with a stop surface 81 for each of the lifting arms 49, which stop surface is provided on the operating member 59 and extends substantially perpendicularly to the axis of rotation 3, and with a locking element 83 which, for co-operation with the stop surface 81, is provided on the relevant lifting arm 49, near the second end 55 of the lifting arm 49. The second locking member 79 is provided, for each one of the lifting arms 49, with a further stop surface 85 which is also provided on the operating member 59 and extends substantially parallel to the axis of rotation 3, and with a further locking element 87 which, for co-operation with the further stop surface 85, is provided on the relevant lifting arm 49, near the second end 55 of the lifting arm 49. In the embodiment of the clamping device 27 shown in FIGS. 3a and 3b, the stop surface 81 connects substantially at right angles to the further stop surface 85, while the locking element 83 also forms the further locking element 87.

The operation of the above-described clamping device 27 in accordance with the invention is as follows. In the state shown in FIG. 3b, the clamping member 35 and the lifting member 37 are both in their second positions. In this state, the lifting member 37 is held in its second position under the influence of the elastic pre-stressing force exerted by the elastic hinges 73. By means of the first locking member 77, the clamping member 35 is held in its second position, against the elastic pre-stressing force exerted by the elastic hinges 69, by the co-operation of the locking element 83 with the stop surface 81. To place and clamp an information carrier 9 on the table 1, a user should place the information carrier 9 on the supporting elements 53 of the lifting arms 49 and subsequently push said information carrier, against the elastic pre-stressing force exerted by the elastic hinges 73, towards the table 1. Due to this, the central clamping opening 29 of the information carrier 9 goes past the clamping surfaces 43 of the clamping elements 39. The stop surfaces 81 and the locking elements 83 of the first locking member 77 are formed such that the stop surfaces 81 are only released by the locking elements 83 if the lifting arms 49 of the lifting member 37 are substantially situated in their first positions and the information carrier 9 substantially rests on the supporting surface 33. If the first locking member 77 thus releases the operating member 59, the clamping elements 39 of the clamping member 35 are displaced, under the influence of the elastic prestressing force of the elastic hinges 69, from their second positions shown in FIG. 3b to their first positions shown in FIG. 3a, so that the information carrier 9 is clamped against the supporting surface 33, near its central clamping opening 29, by the clamping surfaces 43 of the clamping elements 39. Since the first locking member 77 only releases the clamping member 35 from its second position if the information carrier 9 already substantially rests on the supporting surface 33, it is precluded that an inner edge 89 of the central clamping opening 29 of the information carrier 9 is damaged by the clamping elements 39 when the information carrier 9 goes past the clamping elements 39 in the placing operation. This advantage is very useful if the information carrier 9 is a DVD. The reason for this being that such a DVD comprises two discs which are attached to one another, which discs may be pushed apart under the influence of a force exerted on the inner edge 89 of the central clamping opening 29. This would render the DVD useless.

In the state shown in FIG. 3a, the lifting arms 49 of the lifting member 37 are held in their first positions, against the elastic pre-stressing force of the elastic hinges 73, by means of the second locking member 79 by co-operation of the further locking element 87 with the further stop surface 85. To unclamp and remove the information carrier 9 from the clamping device 27, the user should displace the operating member 59, against the elastic prestressing force of the elastic hinges 69, towards the table 1, so that the clamping elements 39 are displaced, from their first positions shown in FIG. 3a, to their second positions shown in FIG. 3b. The further stop surfaces 85 and the further locking elements 87 of the second locking member 79 are formed such that the further stop surface 85 only release the further locking elements 87 if the clamping elements 39 are substantially situated in their second positions and the information carrier 9 is entirely released by the clamping member 35. If the second locking member 79 thus releases the lifting member 37, the lifting arms 49 of the lifting member 37 are displaced, under the influence of the elastic pre-stressing force of the elastic hinges 73, from their first positions shown in FIG. 3a to their second positions shown in FIG. 3b, so that the information carrier 9 is lifted from the clamping device 27 and can be removed by the user without hindrance. As soon as the lifting arms 49 are no longer substantially in their first positions, the clamping member 35 is locked in its second position by the first locking member 77. Since the second locking member 79 only releases the lifting member 37 from its first position if the clamping member 35 is substantially situated in its second position, the information carrier 9 is only lifted from the supporting surface 33 by the lifting member 37 if the information carrier has already been substantially released by the clamping member 35. In this manner, it is precluded, also during removing the information carrier 9 from the clamping device 27, that the inner edge 89 of the central clamping opening 29 of the information carrier 9 is damaged by the clamping elements 39 when the information carrier 9 goes past the clamping elements 39.

As shown in FIGS. 3a and 3b, the clamping device 27 is also provided with an electromagnetic actuator 91 having a ring-shaped permanent magnet 93, which is attached to the operating member 59, and an electric coil 95, which is attached to the table 1. The actuator 91 can be controlled by means of the above-mentioned control unit of the scanning device. If the coil 95 is energized in the state shown in FIG. 3a, then the operating member 59 is displaced by the actuator 91 to the position shown in FIG. 3b, as a result of which the information carrier 9 is automatically unclamped and lifted from the clamping device 27. Since the actuator 91 can be controlled by the control unit, the information carrier 9 can be unclamped and lifted, for example automatically, from the clamping device 27 if the user stops or turns off the scanning device by means of an appropriate key.

In FIG. 4, parts of the second embodiment of a clamping device 27' in accordance with the invention which correspond to parts of the above-discussed first embodiment of the clamping device 27, are indicated by corresponding reference numerals. Hereinbelow, only a few differences between the clamping device 27' and the clamping device 27 are discussed. The main difference between the clamping device 27' and the clamping device 27 resides in that the clamping device 27' is not provided with an electromagnetic actuator for displacing the operating member 59, such as the actuator 91 of the clamping device 27. Instead, the clamping device 27' is provided with a mechanical coil spring 97, as shown in FIG. 4, which exerts a pre-stressing force on the operating member 59 in the displacement direction of the operating member 59 which corresponds to a displacement of the clamping elements 39 from their second positions to their first positions. The pre-stressing force of the coil spring 97 thus complements the pre-stressing force exerted by the elastic hinges 69 on the operating member 59. Consequently, an information carrier can only be removed from the clamping device 27' in that a user pushes the operating member 59 towards the table 1. The clamping device 27' further differs from the clamping device 27 in that the clamping device 27' is provided with leaf springs 99 which exert an additional prestressing force on the lifting arms 49 so as to complement the pre-stressing force of the elastic hinges 73. It is noted that, in FIG. 4, the clamping element 39 is shown in its first position, whereas the lifting arm 49 is shown in its second position, and the locking element 83 and the operating member 59 are shown so as to demonstrate an overlap. It will be obvious to those skilled in the art, however, that such a position of the lifting arm 49 and the operating member 59 relative to each other cannot actually occur.

The FIGS. 5a, 5b, 5c, 6a, 6b and 6c diagrammatically show a third embodiment of a clamping device 27" in accordance with the invention. In these Figures, parts of the clamping device 27" which correspond to parts of the above-described clamping devices 27 and 27' are indicated by corresponding reference numerals. In the following description, only the most important differences between the clamping device 27" and the clamping devices 27, 27' will be discussed.

The clamping device 27" includes a lifting member 37, which substantially corresponds to the lifting member 37 of the clamping devices 27, 27' and which is provided with three identical lifting arms 49. As shown in FIGS. 5b and 6b, the lifting arms 49 are each supported in bearings so as to be tiltable about a tilting axle 101, which is only diagrammatically shown, and pre-stressed, by means of a leaf spring 103, in a direction corresponding to a displacement of the lifting arm 49 from its first position, shown in FIG. 5b, to its second position shown in FIG. 6b. The clamping device 27" further includes a clamping member 105 which co-operates with the lifting member 37, which clamping member differs from the clamping member 35 of the clamping devices 27, 27' and is provided with three identical swiveling arm-shaped clamping elements 107, which each extend in a direction substantially parallel to the information carrier 9, which are provided, near an end 109, with a clamping surface 111 for co-operation with the central clamping opening 29 of the information carrier 9, and which are bearing-supported, near a central part 113, so as to be pivotable about a swiveling axle 115 which extends substantially parallel to the axis of rotation 3. The lifting arms 49 and the clamping elements 107 of the clamping device 27" are arranged in the same manner about the axis of rotation 3 as the lifting arms 49 and the clamping elements 39 of the clamping device 27. For the sake of simplicity, however, FIGS. 5a and 6a only show one of the lifting arms 49 and one of the clamping elements 107.

The clamping device 27" further includes an operating member 117 which is centrally arranged between the lifting arms 49 and the clamping elements 107, which operating member is concentrically arranged relative to the axis of rotation 3 and displaceably guided, parallel to the axis of rotation 3, relative to a bush-shaped guide 61 which is secured to the table 1. The clamping elements 107 each comprise a further end 119 which is situated, with respect to the swiveling axle 115 of the relevant clamping element 107, approximately diametrically opposite the end 109. With their further ends 119, the pre-stressed clamping elements 107 lie against a stop surface 121 of the operating member 117, as shown in detail in FIGS. 5c and 6c. Said pre-stress is supplied, for example, by a torsion spring 123, which is known per se and customarily used, which is only diagrammatically shown in FIGS. 5a and 6a and arranged around each of the swiveling axles 115. As shown in FIGS. 5c and 6c, the stop surface 121 has a conical portion 125, which is concentrically arranged relative to the axis of rotation 3, a cylindrical portion 127, which connects to the conical portion 125 near an end of the conical portion 125 where the diameter of the conical portion 125 is largest, and a further cylindrical portion 129, which connects to the conical portion 125 near a further end of the conical portion 125 where the diameter of the conical portion 125 is smallest. Co-operation between the further ends 119 of the clamping elements 107 and the stop surface 121 of the operating member 117 enables the clamping elements 107 to be jointly swiveled by a displacement of the operating member 117, from a first position shown in the FIGS. 5a and 5c, in which the ends 119 lie against the further cylindrical portion 129 of the stop surface 121 and in which the information carrier 9 can be clamped against the supporting member 31 by means of the clamping elements 107, to a second position shown in FIGS. 6a and 6c, in which the ends 119 lie against the cylindrical portion 127 of the stop surface 121 and in which the information carrier 9 is released by the clamping elements 107. The clamping device 27" is further provided with a mechanical coil spring 131, shown in FIGS. 5b, 5c, 6b and 6c, which exerts a pre-stressing force on the operating member 117 in a direction which corresponds to a displacement of the clamping elements 107 from their second positions to their first positions.

The clamping device 27" is provided, just like the clamping devices 27 and 27', with a first locking member 133, which locks the clamping member 105 in its second position if the lifting member 37 is not substantially in its first position, and with a second locking member 135, which locks the lifting member 37 in its first position if the clamping member 105 is not substantially in its second position. The first locking member 133 comprises the cylindrical portion 127 of the stop surface 121 of the operating member 117, a recess 137 which is formed in the further cylindrical portion 129 of the stop surface 121, and a locking element 139 which is provided on each of the lifting arms 49 for co-operation with the recess 137. The recess 137 and the locking element 139 are shown in the FIGS. 5b and 6b. The second locking member 135 comprises the further cylindrical portion 129 of the stop surface 121 of the operating member 117, and a further locking element 141 which is provided on each of the lifting arms 149 for co-operation with the further cylindrical portion 129 of the stop surface 121 and for co-operation with a further recess 143 formed in the further cylindrical portion 129. In the embodiment of the clamping device 27" shown in the FIGS. 5b and 6b, the locking element 139 also forms the further locking element 141, while the recess 137 also forms the further recess 143.

As will be explained hereinbelow, the operation of the clamping device 27" corresponds to the above-described operation of the clamping devices 27 and 27', which can be attributed to the use of the first locking member 133 and the second locking member 135. In the state shown in FIGS. 6a, 6b and 6c, the clamping member 105 and the lifting member 37 are both in their second positions. In this state, the lifting member 37 is held in its second position under the influence of the pre-stressing force of the leaf springs 103. By means of the first locking member 133, the operating member 117 is held in a position shown in FIGS. 6b and 6c, against the pre-stressing force of the coil spring 131, by co-operation of the locking element 139 with the recess 137. In this position of the operating member 117, the ends 119 of the clamping elements 107 rest against the cylindrical portion 127 of the stop surface 121, so that the clamping elements 107 are locked in their second positions. To place and clamp an information carrier 9 on the table 1, a user should place the information carrier 9 on the supporting elements 53 of the lifting arms 49 and, subsequently, move said information carrier, against the pre-stressing force of the leaf springs 103, towards the table 1. The recess 137 and the locking element 139 of the first locking member 133 are shaped so that the operating member 117 is only released from its position shown in FIGS. 6b and 6c if the lifting arms 49 are substantially situated in their first positions, and the information carrier 9 substantially rests on the supporting surface 33. If the first locking member 133 releases the operating member 117, the operating member 117 is displaced, under the influence of the prestressing force exerted by the coil spring 131, to a position shown in FIGS. 5b and 5c. As a result, the clamping elements 107 are displaced, by co-operation of the ends 119 with the conical portion 125 of the stop surface 121, from their second positions shown in FIG. 6a to their first positions shown in FIG. 5a, so that the information carrier 9 is clamped, near its central clamping opening 29, against the supporting surface 33 by the clamping surfaces 111 of the clamping elements 107.

Figure 5A:
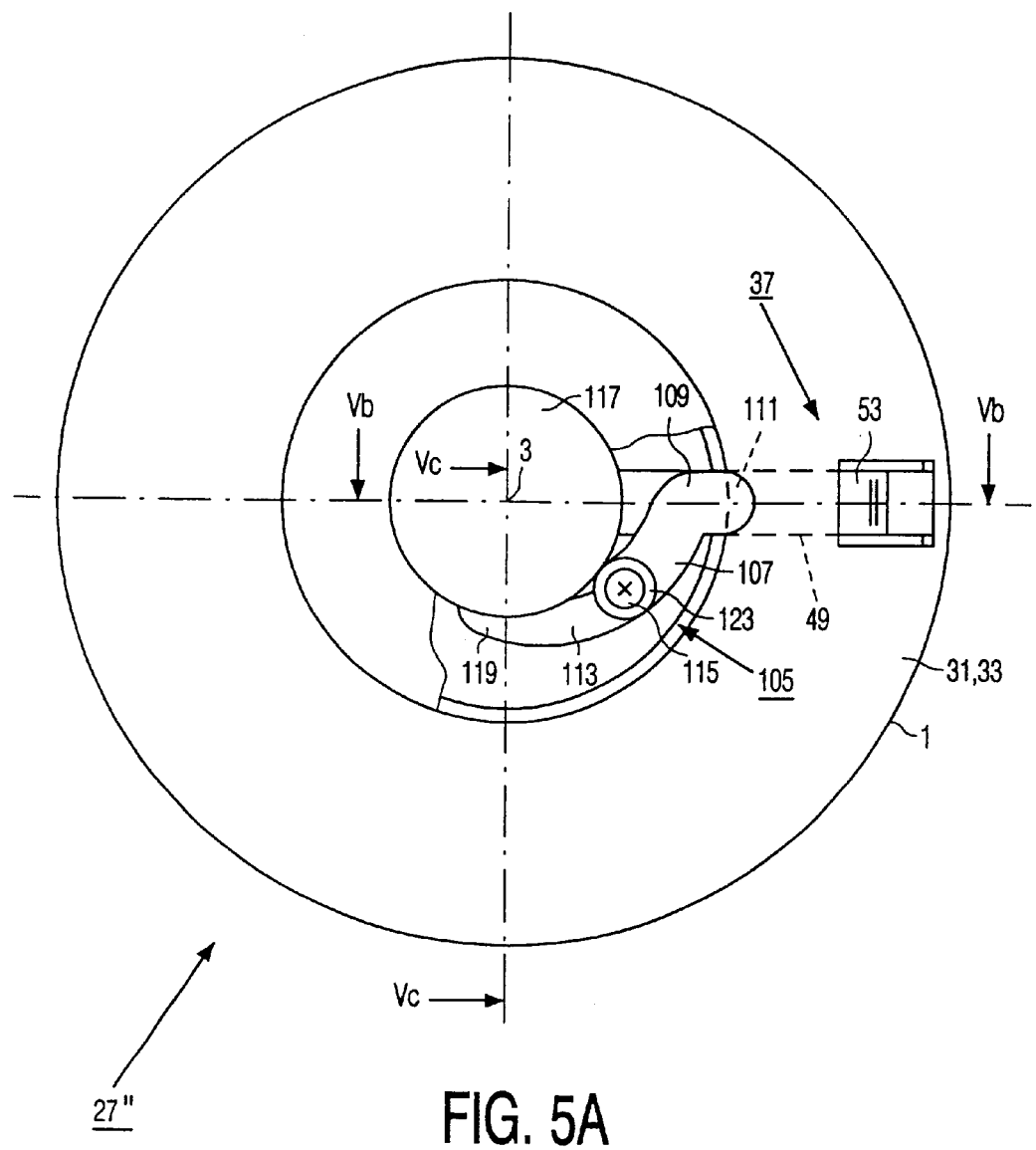
FIG. 5a is a diagrammatic plan view of a third embodiment of a clamping device in accordance with the invention, which can be used in the scanning device in accordance with FIG. 1, a lifting member and a clamping member of the clamping device both being in a first position.
Figure 5B:
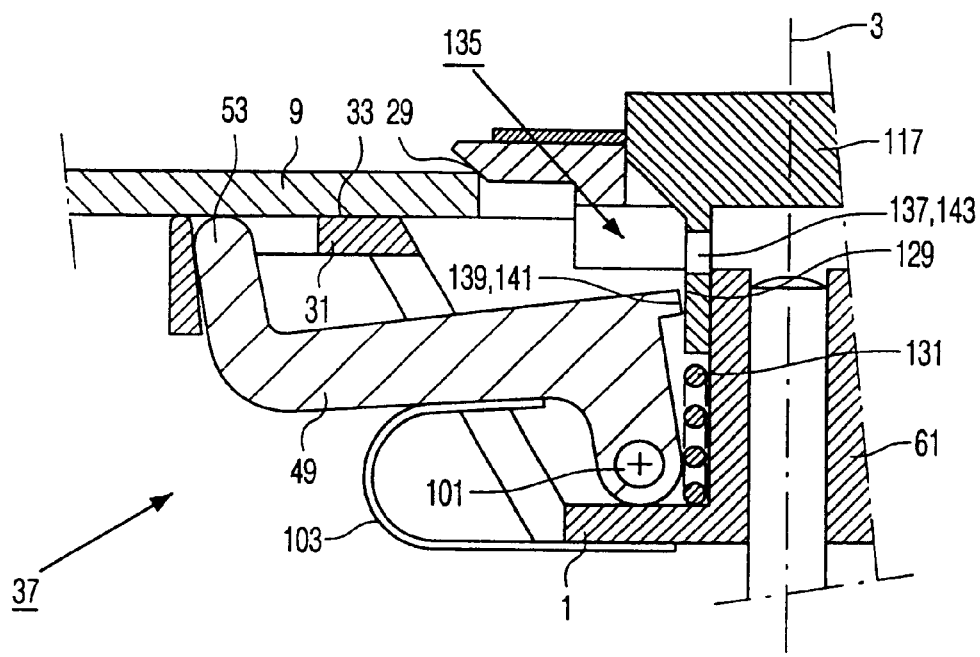
FIG. 5b is a diagrammatic sectional view taken on the line Vb—Vb in FIG. 5a, FIG. 5c is a diagrammatic sectional view taken on the line Vc—Vc in FIG. 5a, FIG. 6a is a diagrammatic plan view of the clamping device in accordance with FIG. 5a, in which the lifting member and the clamping member are both in a second position.
Figure 5C:
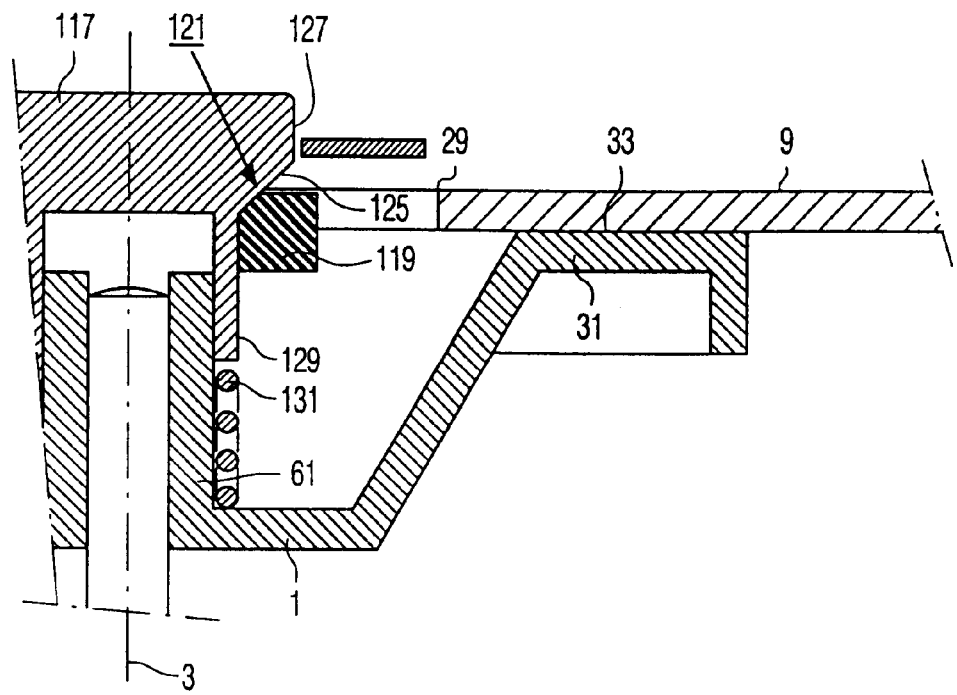
Figure 6A:
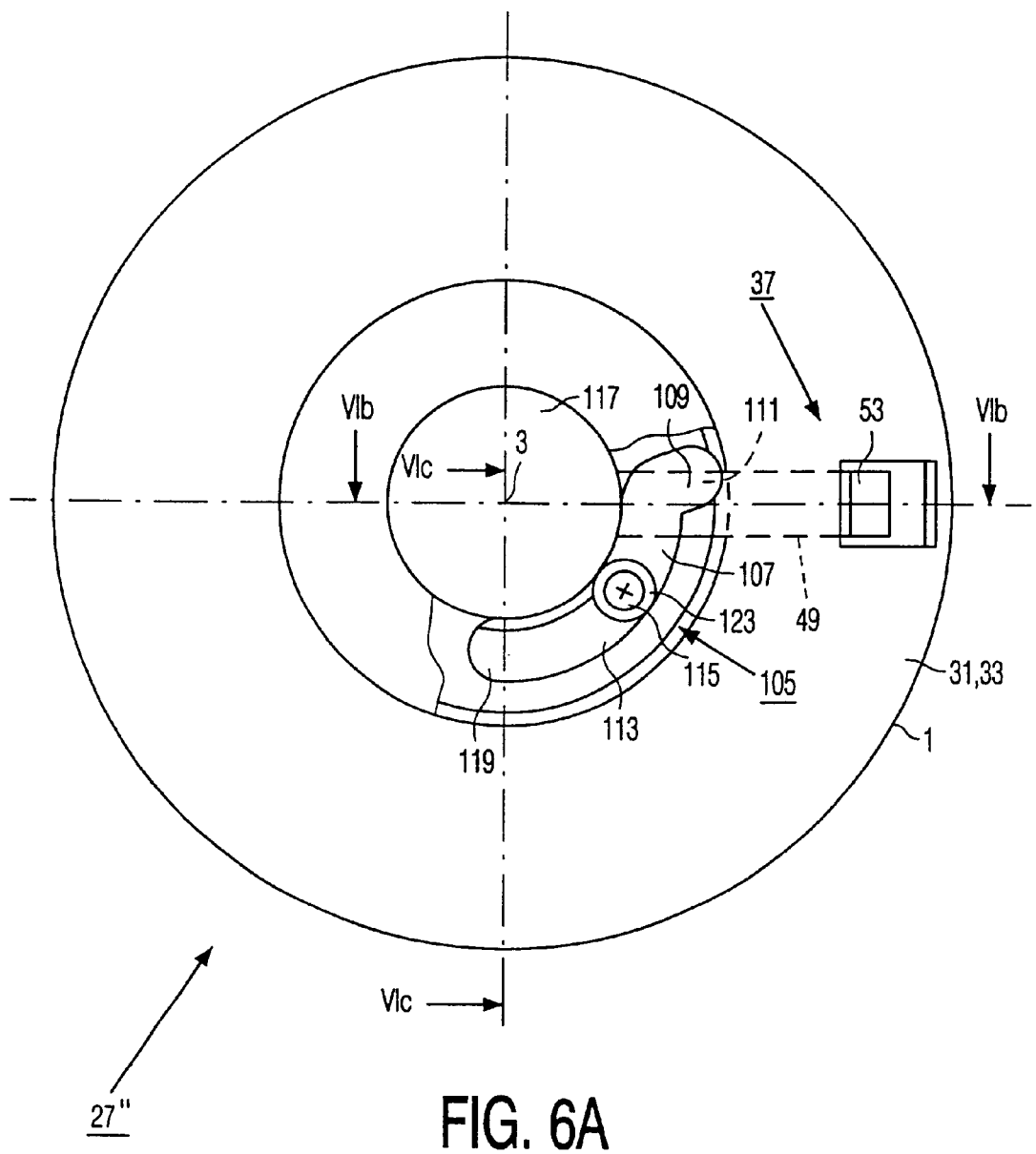
Figure 6B:
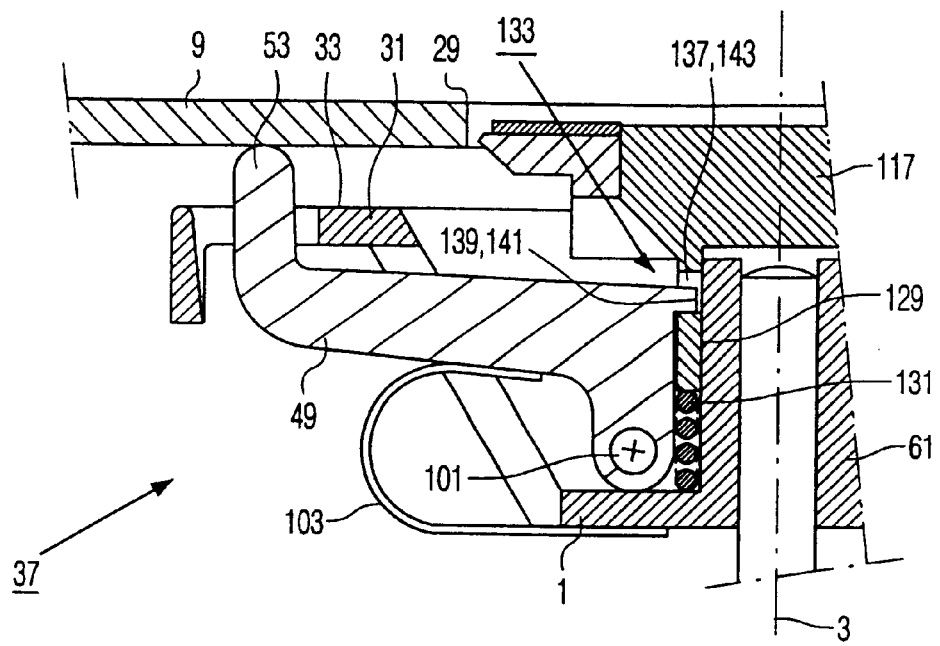
Figure 6C:
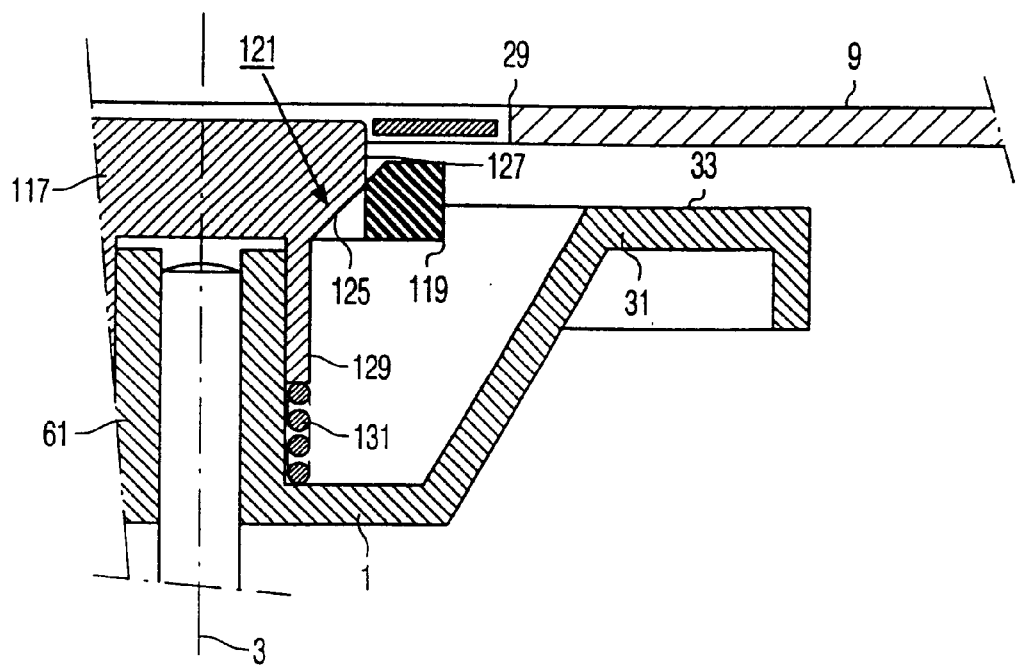

In the state shown in FIGS. 5a, 5b and 5c, the lifting arms 49 of the lifting member 37 are locked in their first positions, against the pre-stressing force exerted by the leaf springs 103, by means of the second locking member 135 by co-operation of the further locking element 141 with the further cylindrical portion 129 of the stop surface 121. To unclamp and remove the information carrier 9 from the clamping device 27", the user must press the operating member 117, against the pre-stressing force exerted by the coil spring 131, towards the table 1, thereby causing the clamping elements 107 to be displaced from their first positions shown in FIG. 5a to their second positions shown in FIG. 5b, as a result of cooperation of the ends 119 with the conical portion 125 of the stop surface 121. The further recess 143 is formed in the further cylindrical portion 129 of the stop surface 121 in such a manner that, under the influence of the pre-stressing force exerted by the leaf spring 103, the further locking element 141 only drops into the further recess 143 if the clamping elements 107 are substantially situated in their second positions and the information carrier 9 is entirely released by the clamping member 105. If the second locking member 135 thus releases the lifting member 37, the lifting arms 49 of the lifting member 37 are displaced, under the influence of the pre-stressing force exerted by the leaf springs 103, from their first positions shown in FIG. 5b to their second positions shown in FIG. 6b, so that the information carrier 9 is lifted from the clamping device 27" and can be removed by the user. As soon as the lifting arms 49 are no longer substantially in their first positions, the clamping member 35 is locked again in its second position by the first locking member 133 by co-operation of the locking element 139 and the recess 137. It will be obvious to those skilled in the art that by means of the above-described operation of the clamping device 27", advantages are obtained which correspond to the above-discussed advantages of the clamping devices 27 and 27'.

The above-described embodiments of the clamping device 27, 27' and 27" can suitably be used in the above-described scanning device in accordance with the invention. It is noted that a clamping device in accordance with the invention can also be used in a different manner, for example in a box-shaped holder for a disc-shaped information carrier. It is further noted that a clamping device in accordance with the invention cannot only be used in an optical player as described hereinabove, but also in other types of scanning devices, such as a magnetic or magneto-optical scanning device.

Finally, it is noted that a clamping device in accordance with the invention may be provided with a type of clamping member, lifting member, first locking member and second locking member, which differ from the above-described clamping members 35 and 105, the above-described lifting member 37, the above-described first locking members 77 and 133, and the above-described second locking members 79 and 135. One might think, for example, of a clamping member including a different type or a different number of clamping elements, and a lifting member including a different type or different number of lifting arms. The construction of the first locking member and the second locking member in such an alternative clamping device in accordance with the invention is determined to a substantial degree by the construction of the clamping member and the lifting member.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. The scope of the invention is not limited to the embodiments, but lies in each and every novel feature or combination of features described above and in every novel combination of these features. Thus, the scope of the invention is only limited by the following claims:

What is claimed is:

1. A clamping device for a disc-shaped information carrier having a central clamping opening, comprising:
   a supporting member for the information carrier;
   a clamping member which can be displaced from a first position, in which the clamping member clamps the information carrier against the supporting member close to the clamping opening, to a second position in which the clamping member releases the information carrier,
   a lifting member which co-operates with the clamping member and can be displaced from a first position, in which the lifting member is recessed relative to the supporting member, to a second position in which the lifting member is in a raised position relative to the supporting member,
   a first locking member, which locks the clamping member in its second position if the lifting member is not substantially in its first position; and
   a second locking member which locks the lifting member in its first position if the clamping member is not substantially in its second position.

2. The device of claim 1, further comprising means for exerting a pre-stressing force on the lifting member, the pre-stressing force being directed from the first position of the lifting member to the second position of the lifting member.

3. The device of claim 1, in which the lifting member includes a number of lifting arms each extending substantially in a radial direction with respect to the information carrier, which lifting arms are provided, near a first end portion, with a supporting element for the information carrier, and which lifting arms are tiltable, near a second end portion, about a tilting axle extending substantially in a tangential direction with respect to the information carrier.

4. The device of claim 3, in which the tilting axle of each of the lifting arms is formed by an elastically deformable hinge, the hinges jointly supplying the pre-stressing force exerted on the lifting member.

5. The device of claim 1, in which the clamping member includes a number of clamping elements each extending in a direction transverse to the information carrier, which clamping elements are provided with a clamping surface near a first end portion, and are tiltable, near a second end portion, about a tilting axle extending substantially in a tangential direction with respect to the information carrier.

6. The device of claim 5, in which the clamping elements are coupled to a common operating member which can be displaced in a direction perpendicular to the information carrier, the clamping elements being jointly displaceable from their first positions to their second positions by a displacement of the operating member.

7. The device of claim 6, in which the clamping device is provided with further means for exerting a prestressing force on the operating member in a displacement direction of the operating member which corresponds to a displacement of the clamping elements from their second positions to their first positions.

8. The device of claim 6, in which the clamping device is provided with an electromagnetic actuator for displacing the operating member.

9. The device of claim 5, in which the first locking member is provided with a stop surface which is provided on the operating member and extends substantially parallel to the information carrier, while each of the lifting arms is provided, near its second end portion, with a locking element pertaining to the first locking member, which locking element serves to co-operate with the stop surface.

10. The device of claim 5, in which the second locking member is provided with a further stop surface, which is provided on the operating member and extends substantially perpendicularly to the information carrier, while each one of the lifting arms is provided, near its second end portion, with a further locking element pertaining to the second locking member, which locking element serves to co-operate with the further stop surface.

11. The device of claim 1, in which the clamping member includes a number of clamping elements which each extend in a direction substantially parallel to the information carrier, which are provided, near an end portion, with a clamping surface and can be swiveled about a swivel axle extending substantially perpendicularly to the information carrier.

12. The device of claim 11, in which near a further end portion, the clamping elements bear against a stop surface of the operating member while being subjected to a pre-stress, which stop surface comprises a conical portion extending transversely to the information carrier and serving to co-operate with the further end portions of the clamping elements.

13. The device of claim 12, in which the first locking member comprises a cylindrical portion of the stop surface of the operating member, which cylindrical portion extends perpendicularly to the information carrier and serves to co-operate with the further end portions of the clamping elements, the cylindrical portion connecting to the conical portion of the stop surface near an end portion of the conical portion where the diameter of the conical portion is largest, while each one of the lifting arms is provided, near its second end portion, with a locking element pertaining to the first locking member, which locking element serves to co-operate with a recessed portion provided in the operating member.

14. The device of claim 12, in which the second locking member comprises a further cylindrical portion of the stop surface of the operating member, which further cylindrical portion extends perpendicularly to the information carrier and connects to the conical portion of the stop surface near a further end portion of the conical portion where the diameter of the conical portion is smallest, while each one of the lifting arms is provided, near its second end portion, with a further locking element pertaining to the second locking member, which locking element serves to co-operate with the further cylindrical portion and a further recessed portion provided in the further cylindrical portion.

15. The device of claim 1, in which:

the device further comprises means for exerting a pre-stressing force on the lifting member, the pre-stressing force being directed from the first position of the lifting member to the second position of the lifting member;

the lifting member includes a number of lifting arms each extending substantially in a radial direction with respect to the information carrier, which lifting arms are provided, near a first end portion, with a supporting element for the information carrier, and which lifting arms are tiltable, near a second end portion, about a tilting axle extending substantially in a tangential direction with respect to the information carrier; and the tilting axle of each of the lifting arms is formed by an elastically deformable hinge, the hinges jointly supplying the pre-stressing force exerted on the lifting member.

16. The device of claim 15, in which:

the clamping member includes a number of clamping elements each extending in a direction transverse to the information carrier, which clamping elements are provided with a clamping surface near a first end portion, and are tiltable, near a second end portion, about a tilting axle extending substantially in a tangential direction with respect to the information carrier;

the clamping elements are coupled to a common operating member which can be displaced in a direction perpendicular to the information carrier, the clamping elements being jointly displaceable from their first positions to their second positions by a displacement of the operating member;

the device is provided with further means for exerting a pre-stressing force on the operating member in a displacement direction of the operating member which corresponds to a displacement of the clamping elements from their second positions to their first positions;

the clamping device is provided with an electromagnetic actuator for displacing the operating member;

the first locking member is provided with a stop surface which is provided on the operating member and extends substantially parallel to the information carrier, while each of the lifting arms is provided, near its second end portion, with a locking element pertaining to the first locking member, which locking element serves to co-operate with the stop surface; and the second locking member is provided with a further stop surface, which is provided on the operating member and extends substantially perpendicularly to the information carrier, while each one of the lifting arms is provided, near its second end portion, with a further locking element pertaining to the second locking member, which locking element serves to co-operate with the further stop surface.

17. The device of claim 15, in which:

the clamping member includes a number of clamping elements which each extend in a direction substantially parallel to the information carrier, which are provided, near an end portion, with a clamping surface and can be swiveled about a swivel axle extending substantially perpendicularly to the information carrier;

the clamping elements are coupled to a common operating member which can be displaced in a direction perpendicular to the information carrier, the clamping elements being jointly displaceable from their first positions to their second positions by a displacement of the operating member;

the clamping device is provided with further means for exerting a pre-stressing force on the operating member in a displacement direction of the operating member which corresponds to a displacement of the clamping elements from their second positions to their first positions;

the clamping device is provided with an electromagnetic actuator for displacing the operating member;

the first locking member is provided with a stop surface which is provided on the operating member and extends substantially parallel to the information carrier, while each of the lifting arms is provided, near its second end portion, with a locking element pertaining to the first locking member, which locking element serves to co-operate with the stop surface; and the second locking member is provided with a further stop surface, which is provided on the operating member and extends substantially perpendicularly to the information carrier, while each one of the lifting arms is provided, near its second end portion, with a further locking element pertaining to the second locking member, which locking element serves to co-operate with the further stop surface.

18. The device of claim 15, in which:

the clamping member includes a number of clamping elements which each extend in a direction substantially parallel to the information carrier, which are provided, near an end portion, with a clamping surface and can be swiveled about a swivel axle extending substantially perpendicularly to the information carrier;

the clamping elements are coupled to a common operating member which can be displaced in a direction perpendicular to the information carrier, the clamping elements being jointly displaceable from their first positions to their second positions by a displacement of the operating member;

the clamping device is provided with further means for exerting a pre-stressing force on the operating member in a displacement direction of the operating member which corresponds to a displacement of the clamping elements from their second positions to their first positions;

the clamping device is provided with an electromagnetic actuator for displacing the operating member;

the first locking member includes a cylindrical portion of the stop surface of the operating member, which cylindrical portion extends perpendicularly to the information carrier and serves to co-operate with the further end portions of the clamping elements, the cylindrical portion connecting to the conical portion of the stop surface near an end portion of the conical portion where the diameter of the conical portion is largest, while each one of the lifting arms is provided, near its second end portion, with a locking element pertaining to the first locking member, which locking element serves to co-operate with a recessed portion provided in the operating member; and the second locking member includes a further cylindrical portion of the stop surface of the operating member, which further cylindrical portion extends perpendicularly to the information carrier and connects to the conical portion of the stop surface near a further end portion of the conical portion where the diameter of the conical portion is smallest, while each one of the lifting arms is provided, near its second end portion, with a further locking element pertaining to the second locking member, which locking element serves to co-operate with the further cylindrical portion and a further recessed portion provided in the further cylindrical portion.

19. A scanning device for scanning information on a disc-shaped information carrier, comprising:

a table for the information carrier, which table is rotatable about an axis of rotation; and a scanning unit which can be displaced with respect to the table a clamping device for clamping the information carrier on the table, including:

a supporting member for the information carrier;

a clamping member which can be displaced from a first position, in which the clamping member clamps the information carrier against the supporting member close to the clamping opening, to a second position in which the clamping member releases the information carrier;

a lifting member which co-operates with the clamping member and can be displaced from a first position, in which the lifting member is recessed relative to the supporting member, to a second position in which the lifting member is in a raised position relative to the supporting member;

a first locking member, which locks the clamping member in its second position if the lifting member is not substantially in its first position; and a second locking member which locks the lifting member in its first position if the clamping member is not substantially in its second position.

* * * * *